United States Patent

Min et al.

[11] Patent Number: 5,871,221
[45] Date of Patent: Feb. 16, 1999

[54] DRIVING APPARATUS FOR BICYCLES AND THE LIKE

[76] Inventors: Yeong Hee Min; Yoong Soon Min, both of 2575 NW. 49th Ave., Apt. 102, Lauderdale Lakes, Fla. 33313

[21] Appl. No.: 791,117

[22] Filed: Jan. 30, 1997

[30] Foreign Application Priority Data

Jun. 19, 1996 [KR] Rep. of Korea ............................ 22428

[51] Int. Cl.$^6$ ...................................................... B62M 1/04
[52] U.S. Cl. .......................... 280/253; 280/237; 74/594.1; 74/516; 74/96
[58] Field of Search .................................. 74/594.1, 516, 74/96; 280/254, 258, 236, 237, 251, 253

[56] References Cited

U.S. PATENT DOCUMENTS

| | | | |
|---|---|---|---|
| 4,077,648 | 3/1978 | Seul | 280/236 |
| 5,029,486 | 7/1991 | Mercat | 280/236 X |
| 5,035,678 | 7/1991 | Hageman | 74/594.1 X |
| 5,095,772 | 3/1992 | Fortson | 74/594.3 |
| 5,515,746 | 5/1996 | Yamaguchi | 74/594.2 |
| 5,516,132 | 5/1996 | Simkins | 280/236 |

*Primary Examiner*—Brian L. Johnson
*Assistant Examiner*—Avraham Lerner
*Attorney, Agent, or Firm*—Malloy & Malloy, P.A.

[57] ABSTRACT

An improved bicycle driving apparatus structured to generate driving power including a driving assembly to generate driving power, a tracking assembly to transmit the driving power to the rear wheel, a speed-shifting assembly structured to permit changing of the gears. The driving assembly includes a right pedal assembly and a left pedal assembly, each structured for movement in an alternating direction and along a generally arcuate path of less than 360 degrees. The driving assembly also includes a variable speed transmission assembly structured to vary the amount of power required for movement of the right and left pedal assemblies. The right pedal assembly includes a right pedal cylindrical hub secured to a drive shaft. Furthermore, it includes a first and second pulling rod, a first and second auxiliary pulling rod, and a right pedal arm extending from the right pedal cylindrical shaft. The left pedal assembly includes a left pedal arm, a first roller, and a second roller disposed upon the drive shaft. The first roller is structured to rotate with the left pedal arm and the second roller is structured to rotate with the drive shaft. The rollers are structured so that a clockwise rotation of the left pedal arm causes a counterclockwise rotation of the second roller, and therefore, the drive shaft, right pedal cylindrical hub, and the right pedal arm. Likewise, a clockwise rotation of the right pedal arm will cause a clockwise rotation of the drive shaft and the second roller, as well as a counterclockwise rotation of the first roller and the left pedal arm.

13 Claims, 10 Drawing Sheets

DRIVING APPARATUS FOR BICYCLES AND THE LIKE

BACKGROUND OF THE INVENTION

1. Field of Invention

The present invention relates to an improved driving apparatus that permits bicycles and the like to be more efficiently powered by movement of a user's legs in an up and down motion. Furthermore, the improved bicycle driving apparatus of the present invention includes a variable transmission assembly permitting a user to choose among an almost unlimited number of gear or speed settings and to smoothly and uniformly shift between these gear or speed settings.

2. Description of the Related Art

The bicycle has been steadily increasing in popularity as a means of transportation, recreation, and fitness. The development of new lightweight metal alloys and other materials have increased the efficiency of bicycles while providing sturdy and durable bicycle designs. Other improvements, such as those permitting a user to shift gears or speeds, have also increased the efficiency and user's enjoyment of bicycles successfully. However, few improvements have increased the efficiency of bicycles by focusing upon the particular leg movements utilized in pedaling so as to impart movement to the bicycle.

Generally, in order to impart movement to a bicycle, a bicyclist moves his legs in a circular manner, and thus, the pedals of the bicycle move in a circular manner, as well and translate into causing the wheels of the bicycle to move forward. Specifically, a user's legs must continuously move the pedals through a forward circular motion of 360 degrees. This type of pedaling motion provides a simplistic design which is relatively easy and inexpensive to manufacture, and which has for the most part, gained universal acceptance, despite the inefficiency inherent in transmitting force by leg movements through a 360 degree circular movement as shown in FIG. 1b. In particular, when a bicyclist's legs move through a 360 degree circular pedaling movement, the majority of force is applied during the downward portion of the forward stroke, "A", as indicated by the arrow marked "A" in FIG. 1b. During this downward portion of the forward stroke, a bicyclist utilizes his or her own body weight advantageously to apply substantial vertical forces and cause forward movement of the bicycle. On the other hand, the top and bottom portions of a circular pedalling stroke require the application of almost entirely horizontal forces. These portions of the pedaling movement are indicated by the arrows marked "B" in FIG. 1b. Naturally, a bicyclist sitting on a bicycle cannot adequately apply horizontal forces to a pedaling mechanism located directly below him or her, as they are very difficult to apply. As such, a significant portion of the 360 degree circular pedal movement is ineffectual in transmitting force or movement to the rear wheel of the bicycle.

Others in the art have struggled to develop a bicycle driving apparatus structured to reduce this inefficiency inherent in a circular pedaling motion of 360 degrees. For example, some prior devices have attempted to limit the motion of the pedals to less than 360 degrees in order to eliminate the "inefficient zones" at the top and bottom of 360 degree pedal movement, such as are labelled B" in FIG. 1b. Existing devices have generally proven to be inadequate, however, in that they entail a variety of intricate parts and a complicated assembly, and in general, they fail to provide a practical solution to eliminating the "inefficient zones" of circular pedal movement.

Furthermore, existing devices have been inadequate in providing a speed-shifting mechanism structured for use with a bicycle driving apparatus which limits the pedal motion to less than 360 degrees. Indeed, the need for a variable speed transmission increases with bicycle or similar device which has a limited range of pedal movement, due to the fatigue that results from the alternating direction of a restricted pedalling movement. Additionally, the ability to vary the amount of force required for pedal movement becomes even more critical when the user must travel uphill, against the wind, or in rough terrain. In conventional bicycle designs which include a variable speed transmission, a complicated series of different sized sprockets are typically disposed on the rear wheel, such that each sprocket size corresponds to a desired "speed" or "gear" for the bicycle. These known designs also typically include a complicated assembly for moving the drive chain from one sprocket to another so as to adjust the speed. Such a speed shifting assembly usually includes several intricate and delicate parts, thereby making the assembly difficult to maintain and readily susceptible to mechanical failures. Furthermore, a user is naturally limited in his or her choice of gears or speeds utilized in existing variable speed transmissions, since a different sprocket must be provided for each speed selected. Moreover, due to the different sized sprockets, a shift in gears typically causes an abrupt change in the pedalling force required and often results in an unsteady and jarring transition between speeds. These problems are further intensified when the circular motion of the pedals is limited to less than 360 degrees, as it will be understood that such a limitation requires the pedals to move in an alternating "up and down" direction, as opposed to a continuous, smooth circular, motion. The lack of a smoothly variable transmission having an infinite number of speed settings further adds to the impracticality of existing devices, since a bicyclist is not able to overcome his or her fatigue by shifting to an easier gear in a smooth and uniform manner. Due to the inability of others in the art to provide a practical and convenient bicycle driving apparatus which limits the circular pedaling motion to less than 360 degrees, it is not surprising that the conventional 360 circular motion apparatus has continued to enjoy universal acceptance in spite of its highly inefficient pedaling mechanism.

Accordingly, there still remains a significant need in the art for a bicycle driving apparatus which limits pedaling motion to the downward portion of the forward stroke in order to eliminate pedal movement through the "inefficient zones" at the top and bottom of a conventional circular 360 degree pedal movement. In particular, there is a need for such a bicycle driving apparatus which is simplistic in design, convenient, and practical. Additionally, in order to overcome problems inherent in prior limited pedal motion devices, there is a need for such a device which includes a smooth shifting transmission so as to permit a cyclist to smoothly and uniformly shift between an infinite variety of speeds or gears to adapt to varying conditions.

SUMMARY OF THE INVENTION

The present invention relates to an improved bicycle driving apparatus permitting a bicycle to be operated by a user's leg movements in a generally up and down motion in order to efficiently generate driving power.

In the preferred embodiment, the bicycle driving apparatus of the present invention includes a right pedal assembly, each and a left pedal assembly structured for movement in an alternating direction and along a generally arcuate path of less than 360 degrees. The right pedal assembly includes a right pedal cylindrical hub secured to a drive shaft, and further, a first and second pulling rod, a first and second auxiliary pulling rod, and a right pedal arm extend from the right pedal cylindrical hub. Additionally, a right pedal is attached to the right pedal arm. The first pulling rod includes a first controller and the second pulling rod includes a second controller, with both controllers being structured to move along the length of the corresponding pulling rod. Additionally, the first and second auxiliary controllers include first and second drive chain contact sections mounted thereon.

The left pedal assembly of the present invention includes a left pedal arm with a left foot pedal. The left pedal assembly further includes a first and a second roller positioned upon the drive shaft such that the first roller rotates with the left pedal arm and the second roller rotates with the drive shaft. A belt extends from the first roller to the second roller by way of an auxiliary roller so that a clockwise rotation of the left pedal arm causes a counterclockwise rotation of the second roller, and therefore, of the drive shaft, right pedal cylindrical hub, and the right pedal arm, as well. The belt is further structured so that a clockwise rotation of the right pedal arm causes a clockwise rotation of the drive shaft and the second roller along with a counterclockwise rotation of the first roller and the left pedal arm.

It is an object of the present invention to provide a bicycle driving apparatus which permits a bicyclist to use substantially up and down leg movements to power a bicycle.

Another object of the present invention is to provide a bicycle driving apparatus which maximizes the power output of a user's leg movements.

A feature of the bicycle driving apparatus according to the present invention is that it minimizes wasteful or inefficient pedaling movement of a user's legs.

A further object of the present invention is to provide a bicycle driving apparatus which is structured to permit a virtually unlimited range of gear or speed settings.

It is also an object of the present invention to provide a bicycle driving apparatus which eliminates pedaling movement in the inefficient zones of a 360 degree circular pedaling movement while offering a simplistic and practical design.

Yet another object of the present invention is to provide a bicycle driving apparatus which permits a user to quickly and effectively choose a gear or speed setting from a virtually unlimited range of gear or speed settings without any interruption or inconvenience to the pedaling effort.

These and other objects, features, and advantages of the present invention will become more readily apparent from the attached drawings and the detailed description of the preferred embodiments, which follow.

BRIEF DESCRIPTION OF THE DRAWINGS

For a fuller understanding of the nature of the present invention, reference should be had to the following detailed description taken in connection with the accompanying drawings in which:

FIG. 2d is a cross-sectional view taken along lines 2d—2d of FIG. 2a.

FIG. 5b is a top cross-sectional view showing the tracking section taken along lines 5b—5b of FIG. 5a.

FIG. 6 is a top cross-sectional view showing an alternative embodiment of the tracking section taken along lines 5b—5b of FIG. 5a.

FIG. 7a is a cross-sectional view of the speed-shifting section taken along lines 7a—7a of FIG. 1a.

Like reference numerals refer to like parts throughout the several views of the drawings.

DETAILED DESCRIPTION OF THE PREFERRED EMBODIMENT

Figure 1A:
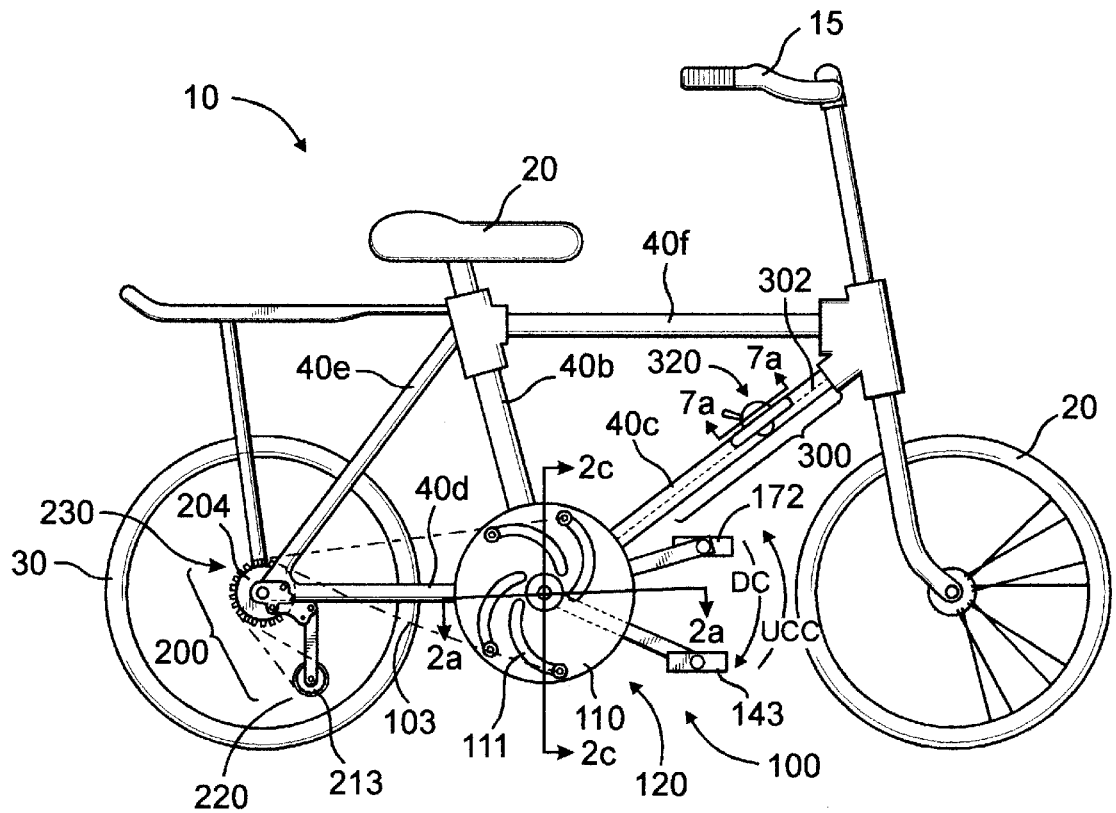
FIG. 1a is a right side view of a bicycle and the bicycle driving apparatus of the present invention.

Shown throughout the Figures, the present invention is directed towards an improved bicycle driving apparatus generally indicated as 10. Although the bicycle driving apparatus may be modified for use on a variety of different bicycle designs or other frame structures, such as three or four wheeled vehicles, the invention will generally be described in relation to a standard bicycle design as shown in FIG. 1a. Initially, as shown in FIG. 1a, it will be seen that a standard bicycle is constructed of multiple support frames 40a–40f placed between the front wheel 20 and the rear wheel 30, handle bars 15, and a seat 20. The present invention, like standard bicycle designs, is structured to generate driving power generally underneath the seat 20 by utilizing a bicyclist's pedaling motion. The present invention, however, utilizes a novel and unobviousness pedaling movement in combination with a variable speed transmission so as to dramatically increase the efficiency of a user's leg movements in transmitting power and movement to a bicycle. Specifically, the improved bicycle driving apparatus 10 of the present invention comprises three main components: a driving assembly 100 to generate driving power; a tracking assembly 200 to transmit the driving power to the rear wheel 30; and a speed shifting assembly 300 structured to permit changing of the gears of the improved bicycle driving apparatus so as to vary the amount of force required to pedal the bicycle.

Figure 2A:
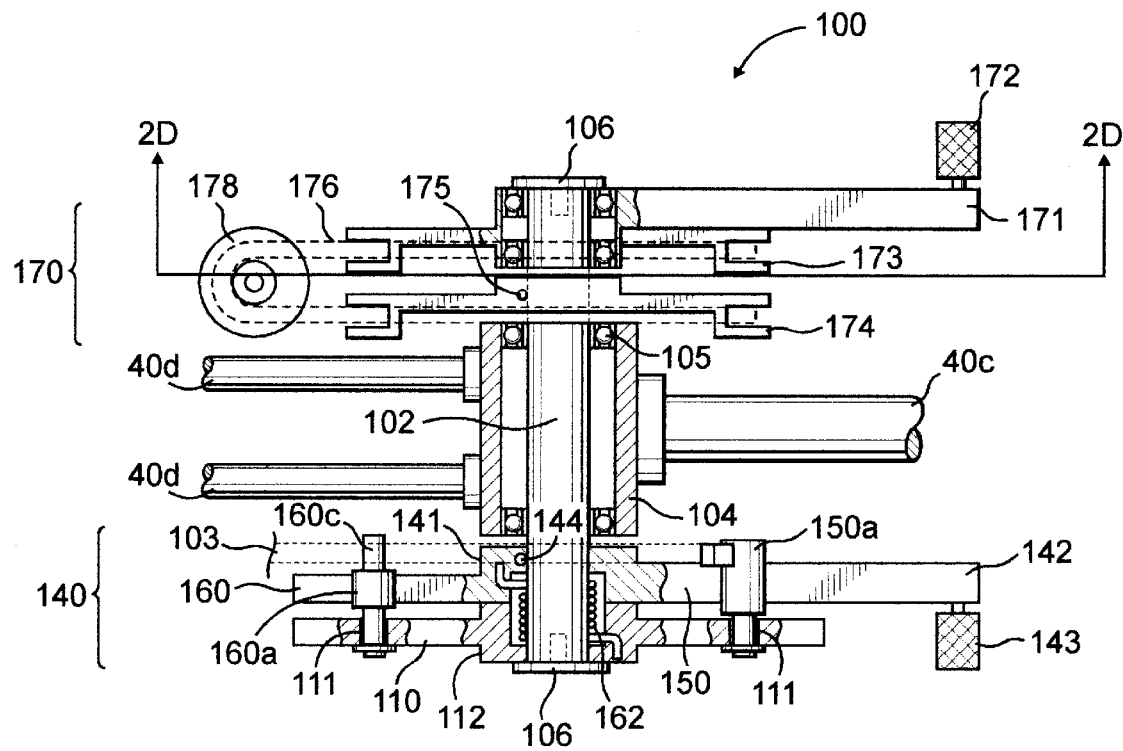
FIG. 2a is a top cross-sectional view taken along lines 2a—2a of FIG. 1a and shows the right and left pedal assemblies of the bicycle driving apparatus.

Referring now to FIGS. 1a and 2a, the driving assembly 100 of the present invention will first be described. The driving assembly 100 of the present invention includes a right pedal assembly 140, and a left pedal assembly 170, and a variable speed transmission assembly 120. The right pedal assembly 140, the left pedal assembly 170, and the variable speed transmission 120 are generally disposed about a drive shaft 102, as will soon become clear from the discussion of which follows. The drive shaft 102 is rotatably mounted inside a crank shaft drum 104 as shown in 2a. Multiple support frames 40d and 40c are fastened to both sides of the crank shaft drum 104 so as to rigidly secure the crank shaft drum 104 to the bicycle frame. As shown in FIG. 2a, the drive shaft 102 preferably has a length greater than the length of the crank shaft drum 104 so as to extend outside each end of the crank shaft drum 104. In the preferred embodiment, support bearings 105 are disposed between the drive shaft 102 and the crank shaft drum 104 in order to enable the drive shaft 102 to freely rotate within the crank shaft drum 104.

Figure 2B:
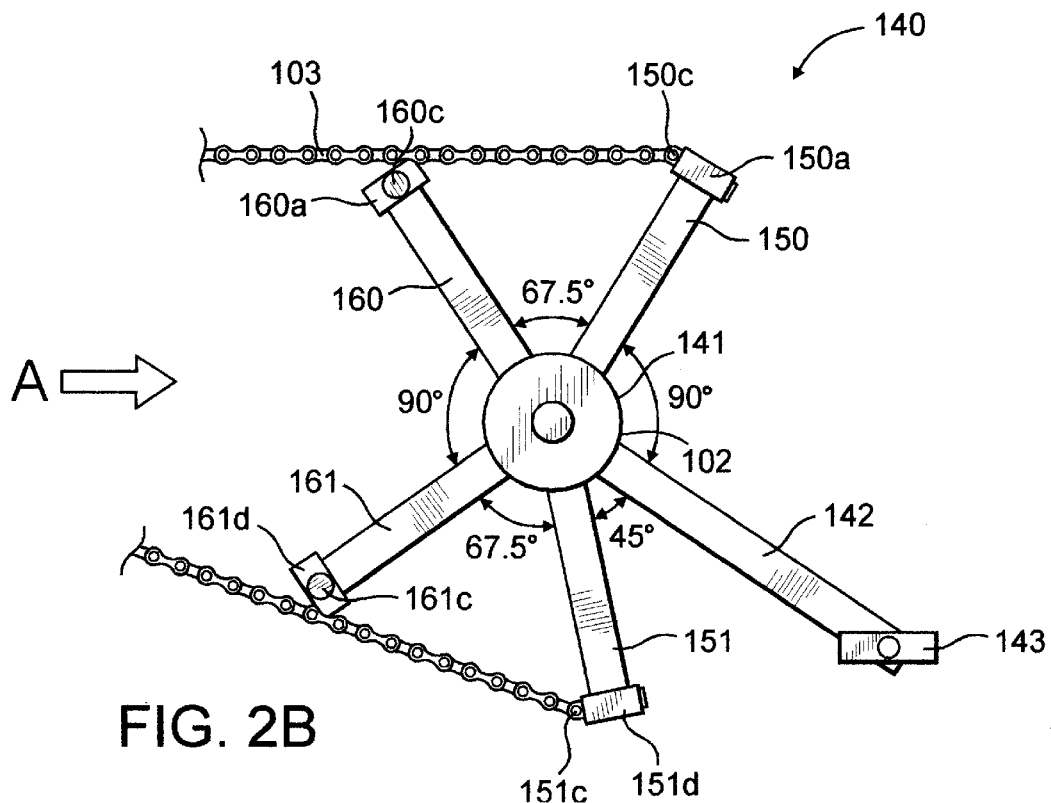
FIG. 2b is a side view of the right pedal assembly with the speed-shifting plate removed.

Still referring to 2a, the right pedal assembly 140 of the drive assembly 100 will now be described. The right pedal assembly 140 is seen to include a right pedal cylindrical hub 141 which is preferably secured to the drive shaft 102 by way of conventional fasteners such as a bolt 144. As shown in FIG. 2b, extending from the right pedal cylindrical hub 141 and preferably forming a single, unitary piece, are: a first pulling rod 150; a second pulling rod 151; a first auxiliary pulling rod 160; a second auxiliary pulling rod 161; and a right pedal arm 142 including a right foot pedal 143 connected thereto. As best shown in FIG. 2b, in the preferred embodiment, the angle between the right pedal arm 142 and the first pulling rod 150 is generally about 90 degrees, while the angle between the right pedal arm 142 and the second pulling rod 151 is generally about 45 degrees. The angle between the first 160 and second 161 auxiliary pulling rods is preferably about 90 degrees. Finally, the angle between the first pulling rod 150 and the first auxiliary pulling rod 160 is preferably about 67.5 degrees while that between the second pulling rod 151 and the second auxiliary pulling rod 161 is also preferably about 67.5 degrees. It will be appreciated that variations in the aforementioned angles may be made without departing from the spirit and scope of the present invention.

Figure 2C:
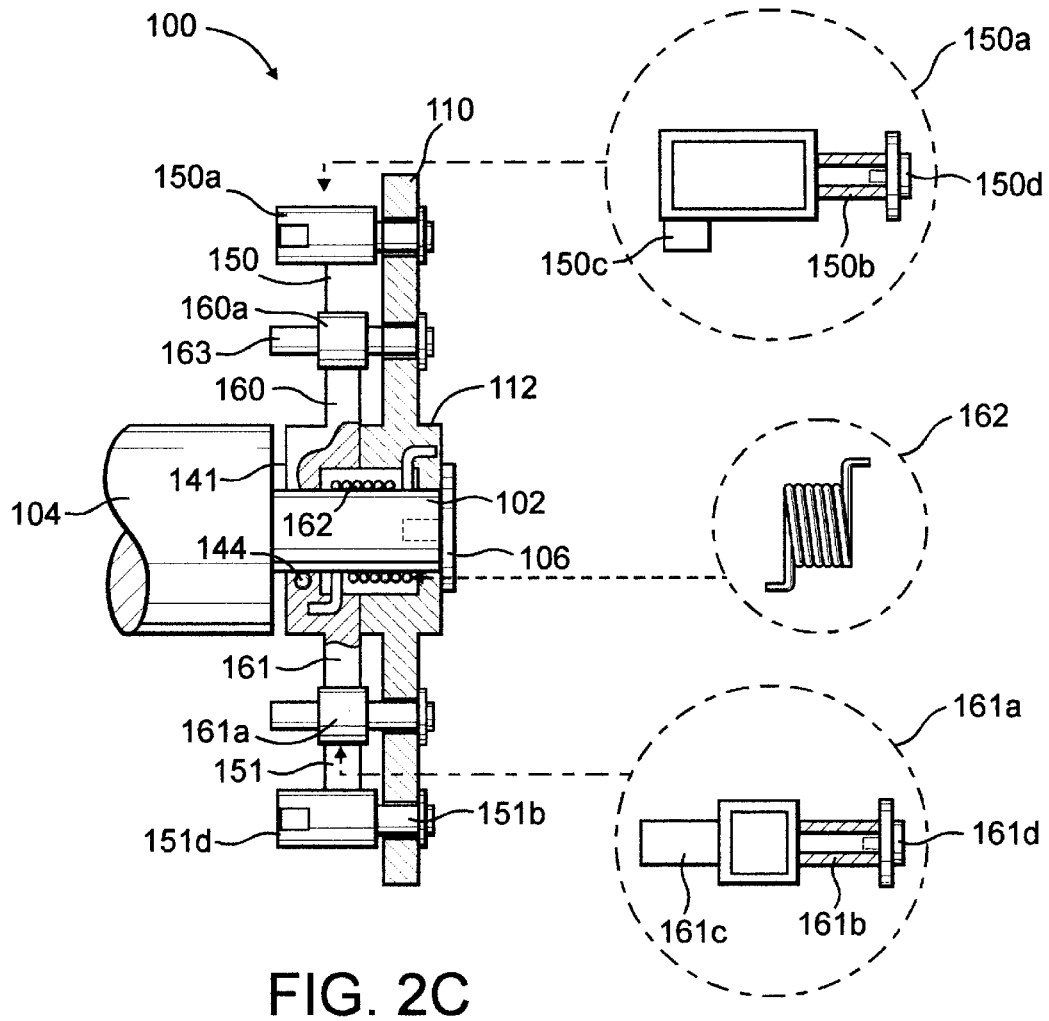
FIG. 2c is a vertical cross section of the right pedal assembly taken along lines 2c—2c of FIG. 1a and shows isolated exploded views of the first controller and the second auxiliary controller as well as the twisted coil spring.

Still referring to FIG. 2b, the first 150 and second 151 pulling rods of the right pedal assembly 140, are seen to preferably include a first and second controller 150a and 151a, respectively, mounted thereon. In the preferred embodiment, the first and second controllers 150a and 151a are structured to be selectively slidable along the length of the first 150 and second 151 pulling arms, respectively, so as to move radially closer to or away from the right pedal cylindrical hub 141, as chosen by a bicyclist. The first and second controllers 150a and 151a preferably include first and second fastening sections 150c and 151c structured to be secured to the drive chain 103, as will be described later with reference to the tracking assembly 200. The first 150a and second 151a controllers preferably further include first and second ring sections 150b and 151b, as best shown in FIG. 2c. A first and second anchoring pin 150d and 151d are structured to be inserted into the first and second ring sections 150b and 151b, as shown in FIG. 2c.

Still referring to FIGS. 2b and 2c, the first 160 and second 161 auxiliary pulling rods of the right pedal assembly 140 will now be discussed. In the preferred embodiment, the first 160 and second 161 auxiliary pulling rods also include a first and second auxiliary controller 160a and 161a, respectively, structured to be slidable along a length of the first 160 and second 161 auxiliary pulling rods. The first 160a and second 161a auxiliary controllers also preferably include a first and second drive chain contact section 160c and 161c structured to guide the drive chain 103, which again, will be described later with reference to the tracking assembly 200. The first 160a and second 161a auxiliary controllers also preferably include first and second auxiliary ring sections 160b and 161b with first 160d and second 161d auxiliary anchoring pins structured to be inserted therein.

Figure 2D:
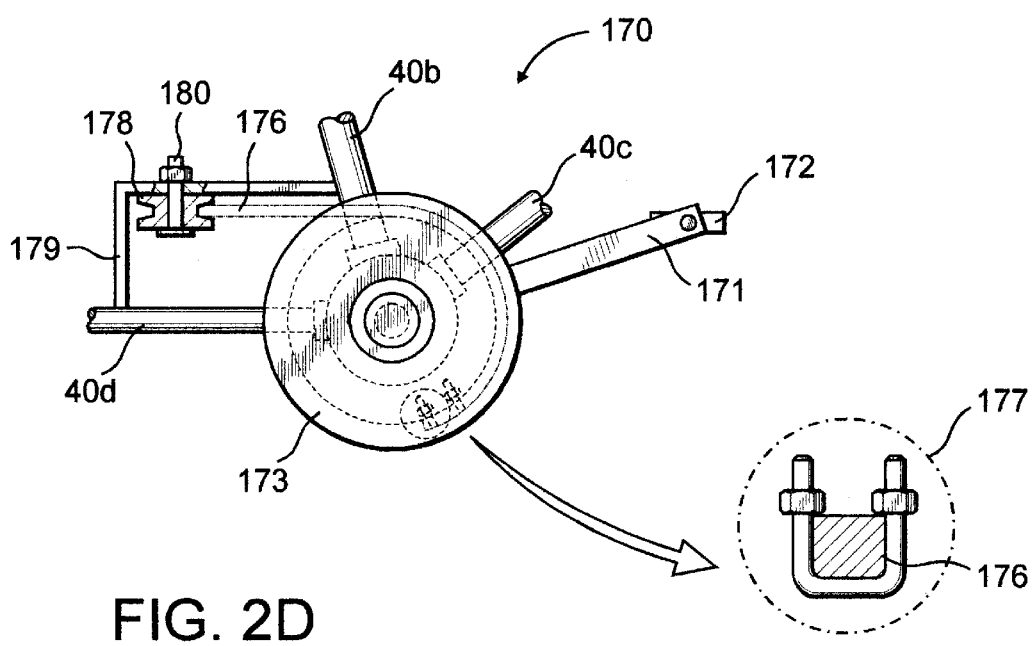

Turning to FIGS. 2a and 2d, the left pedal assembly 170 will now be described. The left pedal assembly 170 is seen to include in the preferred embodiment, a left pedal arm 171, a first roller 173, a second roller 174, and an auxiliary roller 178, as is best shown in 2a. The left pedal arm 171 preferably includes a left foot pedal 172 connected thereto, as shown. The first roller 173 is preferably rotatably mounted on the drive shaft 102, as is best shown in FIGS. 2a and 2d. In the preferred embodiment, the left pedal arm 171 is fastened to the first roller 173 so that the first roller 173 will rotate with the left pedal arm 171 when the left foot pedal 172 is pushed or stepped on by a bicyclist. Unlike the first roller 173, the second roller 174, is not structured to rotate around the drive shaft 102. Instead, in the preferred embodiment, the second roller 174 is rigidly fastened to the drive shaft 102 by conventional fasteners, such as by a fastening bolt 175, so that the second roller 174 is structured and disposed to rotate with the drive shaft 102. To limit the motion of the left pedal arm 171 of the left pedal assembly 170 in the direction of the shaft, a ring or bearing is inserted into the drive shaft 102 between the first 173 and second rollers 174. An anchoring pin 106, see FIG. 2a, is disposed at each end of the drive shaft 102 such that it enables the combined unit of the first roller 173 and the left pedal arm 171 to rotate without any movement in a directional axial to the drive shaft 102. An auxiliary roller 178 is preferably disposed at a location generally spaced-apart and behind the first 173 and second rollers 174 in a relatively horizontal orientation as shown in 2a. In the preferred embodiment, the auxiliary roller 178 is secured to an auxiliary frame 179 which is welded to support frames 40d and 40b of the bicycle, as best shown in FIG. 2d. The auxiliary roller 178 is preferably secured to the auxiliary frame 179 by way of a fastening bolt 180.

Still referring to FIGS. 2a and 2d, in the preferred embodiment, the left pedal assembly 170 further includes a belt 176 directed through the first roller 173, the second roller 174, and the auxiliary roller 178. One end of the belt 176 is preferably secured to the first roller 173 by utilizing U-bolts 177, or other known fasteners. Although one U-bolt 177 per roller 173 and 174 may be sufficient, for greater durability, however, two or more U-bolts 177 are preferably utilized to secure the belt 176 to the first roller 173 as shown in FIG. 2d. In the preferred embodiment, the belt 176 is secured to the first roller 173 after rotating the first roller 173 one-half of one revolution while the left pedal arm 171 is pointing downwards at an angle of preferably between 22 degrees and 23 degrees from a horizontal plane. The other end of the belt 176 is secured by at least one U-bolt 177 to the second roller 174 after the belt 176 is first routed upward to the right, led in the horizontal direction, wrapped around the side of the auxiliary roller 178, then returned in reverse in the horizontal direction and down towards the second roller 174, which is rotated one-half of one revolution, while keeping the right pedal arm 142 pointing downwards at an angle of preferably between 22 degrees and 23 degrees from a horizontal plane. Although one U-bolt 177 per roller 173 and 174 may be sufficient, in the preferred embodiment, two U-bolts 177 are utilized to secure the belt 176 to the first and second rollers 173 and 174.

Figure 3A:
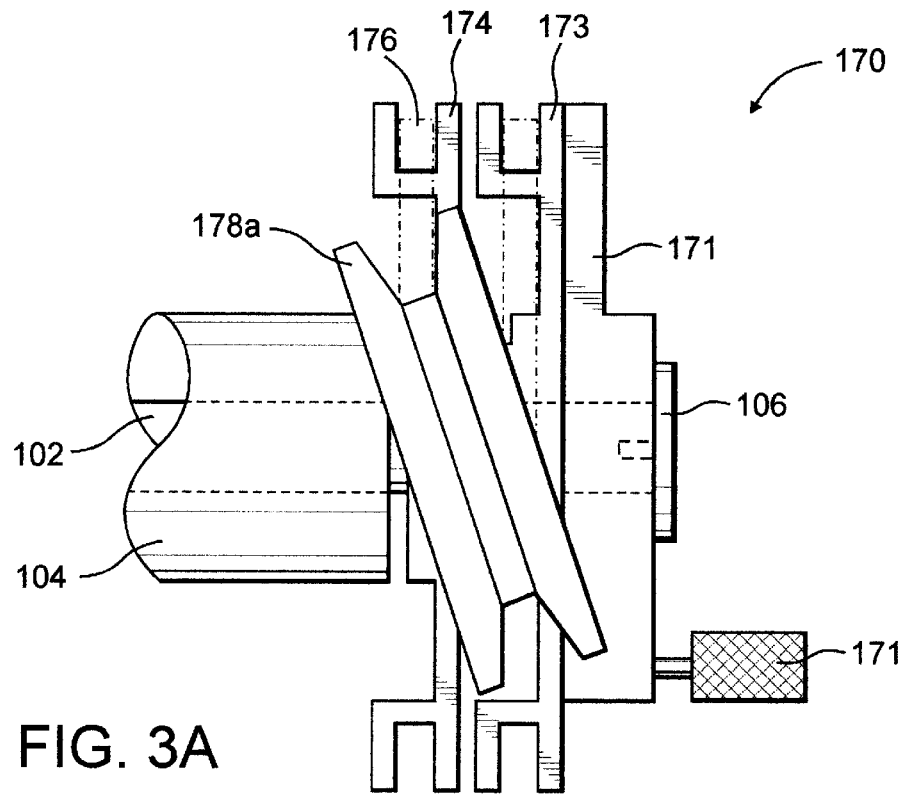
FIG. 3a is a rear view of a first alternative embodiment of the left pedal assembly.

In the preferred embodiment, it will be understood that in order to minimize the space between the first and second roller 173 and 174, the diameter of the auxiliary roller 178 should be as small as possible. In an alternative embodiment, however, as shown in FIG. 3a, the auxiliary roller 178a may be disposed in a substantially vertical orientation so as to permit it's diameter to be increased without requiring an increase in the spacing between the first and second roller 173 and 174. In this embodiment, the top edge of the auxiliary roller 178a should be lined up with the top of the first roller 173 and the bottom edge of the auxiliary roller 178a should be lined up with the second roller 174. In the alternative embodiment shown in FIG. 3a, the routing of the belt 176 is different, although the manner of fastening the belt 176 to the first 173 and second 174 rollers is the same as that shown in FIG. 2d. Since the auxiliary roller 178a is installed with a tilt, the belt 176 is routed from the top of the second roller 174 to the top of the auxiliary roller 178a and then wraps around downward to the left, passes through the bottom of the auxiliary roller 178a, and rises again towards the top of the first roller 173. The contact length of the belt 176 from where the belt 176 reaches the first roller 173 to the fastening point is preferably set to be approximately the same as one-half of one rotation of the first roller 173, and both ends of the belt 176 are fastened side by side to the first 173 and second 174 rollers after both right and left pedal arms 142 and 171 are tilted downwards preferably between 22 degrees and 23 degrees from the horizontal plane.

Figure 1B:
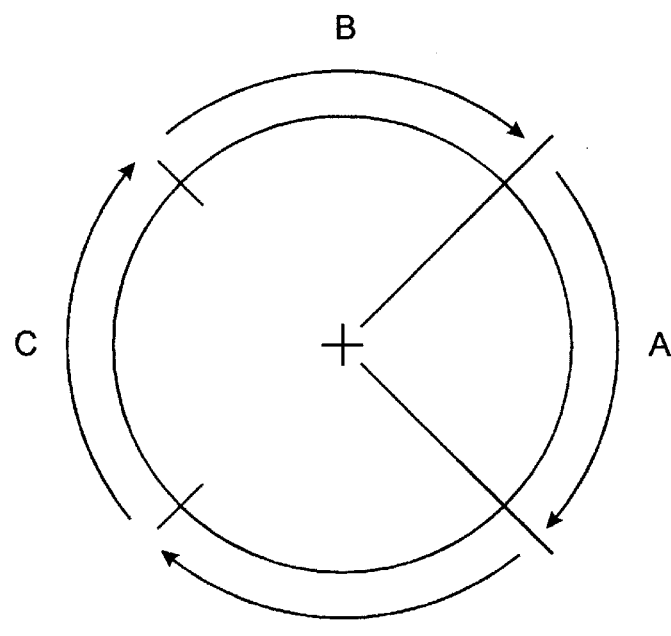
FIG. 1b is a schematic diagram illustrating the 360 degree circular pedal movements of a conventional bicycle.

In operation, the left pedal arm 171, together with the first roller 173, rotate in the downwards clockwise direction as indicated by the arrow labelled "DC" in FIG. 1a when the left foot pedal 172 is pushed downwards, which causes a pulling of the belt 176, which is secured at the bottom of the first roller 173. It will be seen that the belt 176, which moves around the auxiliary roller 178, is guided by the auxiliary roller 178 and causes the second roller 174 to rotate in the counterclockwise direction as indicated by the arrow labelled "UCC" in FIG. 1a. As already described, the second roller 174 is preferably rigidly fastened to the drive shaft 102, and therefore counterclockwise rotation of the second roller 174 causes the drive shaft 102 and therefore the right pedal arm, which is also preferably rigidly fastened to the drive shaft 102, to turn in the upwards counterclockwise direction labelled "UCC" in FIG. 1a. It will be seen, therefore, that the right pedal arm 142 moves in an upwards counterclockwise direction as the left pedal arm 171 moves in a downwards clockwise direction. Likewise, it is seen that as the right foot pedal 143 and therefore the right pedal arm 142 is moved in the downwards clockwise direction labelled "DC" in FIG. 1, the drive shaft 102 and second roller 174 also move in a downwards clockwise direction, causing a pulling of the belt 176 which, in turn, causes the first roller 173 and therefore the left pedal arm 171 and left foot pedal 172, to move in the counterclockwise upwards direction labelled "UCC" in FIG. 1a. It will be seen that the left pedal arm 171 and therefore the left foot pedal 172 will preferably always move in a direction opposite to that of the right pedal arm 142, and therefore, the right foot pedal 143.

Figure 3B:
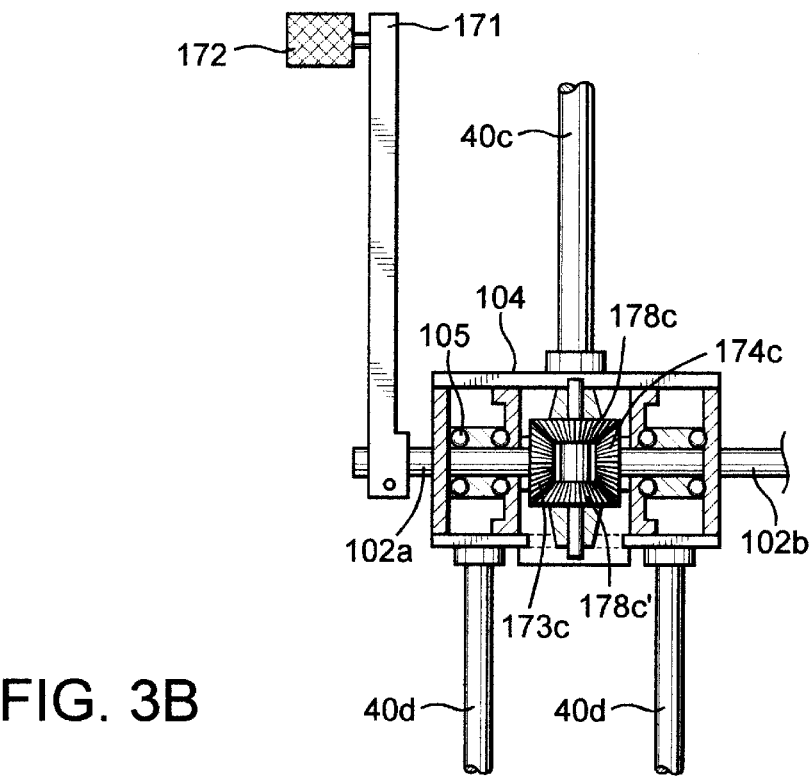
FIG. 3b is a top cross-sectional view taken along lines 2a—2a of FIG. 1a and showing a second alternative embodiment of the left pedal assembly.

In a second alternative embodiment, as shown in FIG. 3b, the first and second rollers 173 and 174 and the auxiliary roller 178 of the left pedal assembly 170, have been eliminated and replaced with a bevel gear system. In this embodiment, the drive shaft 102 is preferably divided into two sections, a left drive shaft section 102a, and a right drive shaft section 102b. A left bevel gear 173c is preferably disposed at the inside end of the left drive shaft section 102a and a right bevel gear 174c is disposed at the right drive shaft section 102b. Furthermore, preferably two, free rotating bevel gears 178c and 178c' are disposed between the right 174c and left 173c bevel gears, as shown in FIG. 3b, although more or even fewer free rotating bevel gears 178c and 178c' may be utilized. The free rotating bevel gears 178c and 178c' are structured such that they matingly engage with the right bevel gear 174c and the left bevel gear 173c and such that clockwise rotation of the right bevel gear 174c causes the free rotating bevel gears 178c and 178c' to rotate and result in counterclockwise rotation of the left bevel gear 173c. Since the right and left bevel gears 174c and 173c are secured to the right drive shaft section 102b and the left drive shaft section 102a, respectively, this alternative embodiment provides the same up and down motion of the foot pedals 143 and 172 as described in the preferred embodiment of the right and left pedal assemblies 140 and 170 shown in 2a. In other words, it will be seen that in the alternative embodiment shown in FIG. 3b, the right foot pedal 143 will move in an upwards counterclockwise ("UCC") direction as the left foot pedal 172 is pushed in a downwards clockwise direction ("DC"). Likewise, a downwards clockwise movement of the right foot pedal 143 will cause an upwards counterclockwise movement of the left foot pedal 172.

Figure 3C:
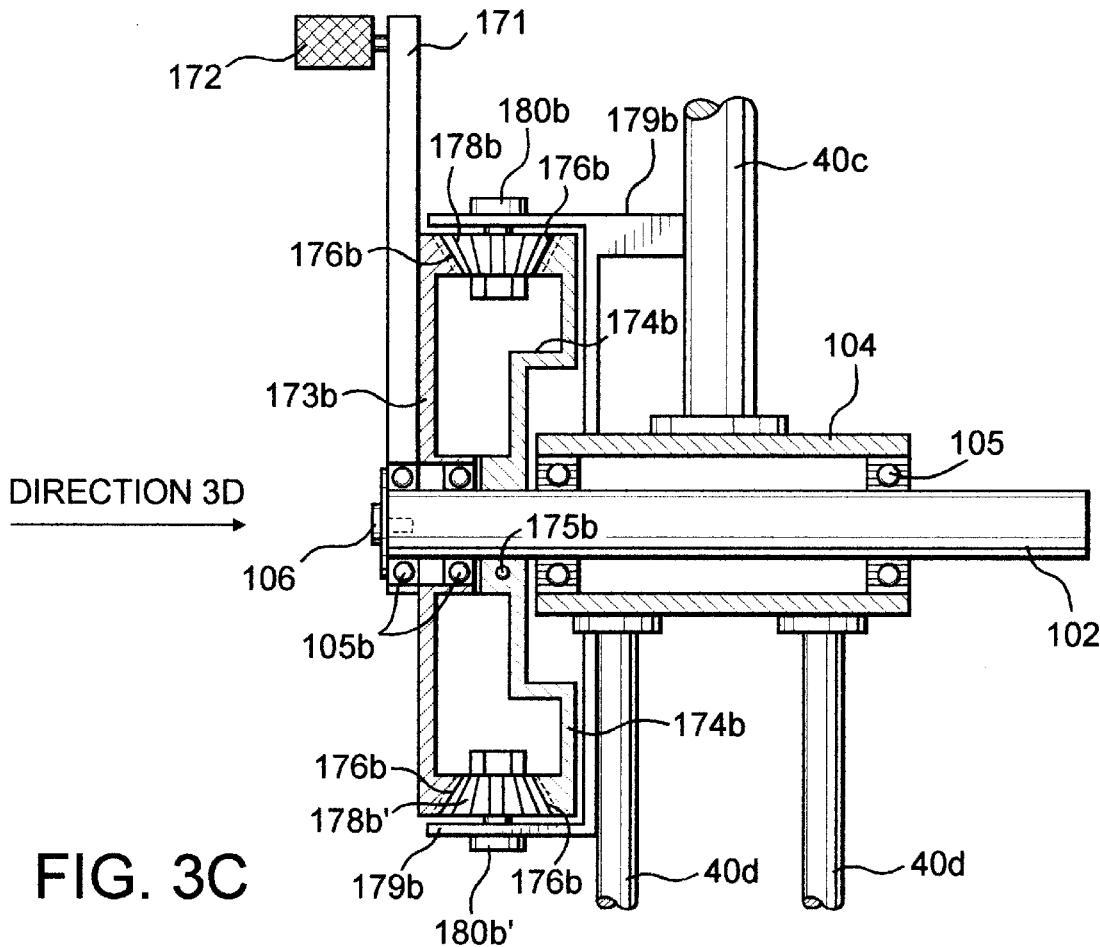
FIG. 3c is a top cross-sectional view taken along lines 2a—2a of FIG. 1a and showing a third alternative embodiment of the left pedal assembly.
Figure 3D:
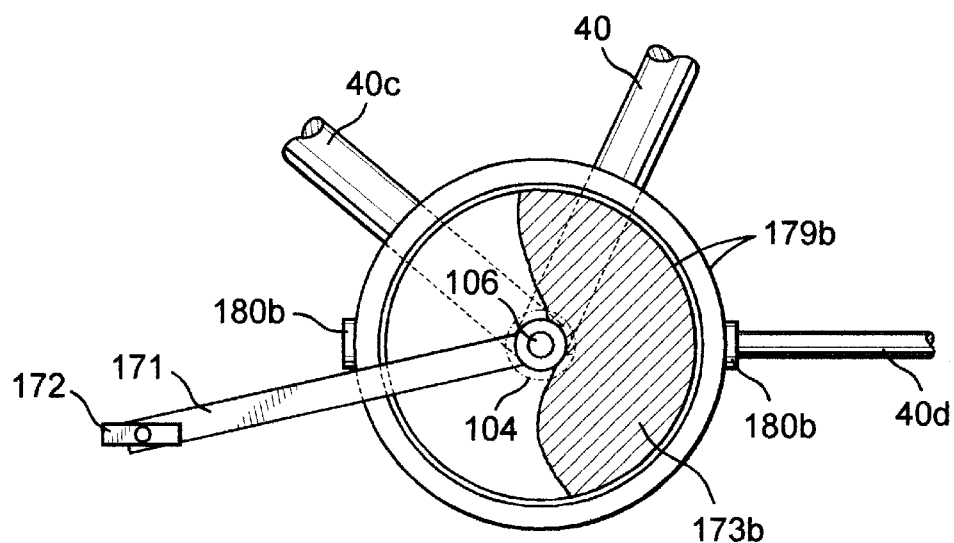
FIG. 3d is a partial cross-sectional view of the third alternative embodiment of the left pedal assembly taken along the directional arrow labelled and shown in 3d FIG. 3c.
Figure 3E:
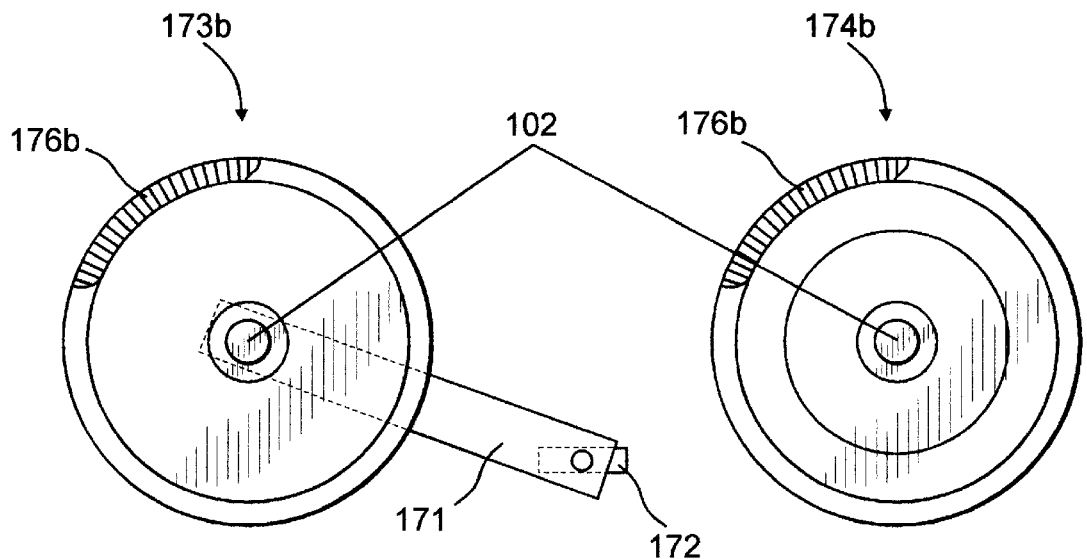
FIG. 3e is a side view showing the rollers of the third alternative embodiment of the left pedal assembly illustrated in FIG. 3c.

A third alternative embodiment of the left pedal assembly 170 is shown in FIGS. 3c–3e, which also utilizes a plurality of bevel gears. In this embodiment, an auxiliary frame 179b is secured to the crank shaft drum 104 and the frame members 40d, 40b, and 40c, using conventional fastening means such as bolts, nuts, screws, welding, and the like, and is structured to secure a plurality of free rotating bevel gears 180b and 180b' therein. In the preferred embodiment, two free rotating bevel gears 180b and 180b' are held in place by the auxiliary frame 179b as shown in FIG. 3e, although it will be understood that more or fewer free rotating bevel gears 180b and 180b' may be utilized without departing from the present invention. In the preferred embodiment, a second bevel roller 174b is positioned on the drive shaft 102, as shown in FIG. 3c, such that the second bevel roller 174b is preferably as close as possible to the crank shaft drum 104. As shown in FIG. 3e, the outer circumference of the second bevel roller 174b is preferably structured with teeth 176b so as to matingly engage the free rotating bevel gears 180b and 180b', as shown in FIG. 3c. The second bevel roller 174b is preferably secured to the drive shaft 102 by conventional fasteners, such as by a fastening bolt 175b. A first bevel roller 173b, is then positioned on the drive shaft 102 and structured such that it is also matingly engaged with the free rotating bevel gears 180 and 180'. It is seen, therefore, in the preferred embodiment, that the bevel gears 180b and 180b' are sandwiched between, and matingly engaged with, the first 173b and second 174b bevel rollers. It should be noted that support bearings 105b are preferably disposed between the first bevel roller 173b and the drive shaft 102 so as to permit the first bevel roller 173b to rotate with respect to the drive shaft 102. In the preferred embodiment, the first bevel roller 173b is structured to be rigidly fastened to the left pedal arm 171 such that the left pedal arm 171 and the first bevel roller 173b rotate as a single unit. In operation, it will be seen that a downwards movement of the left pedal arm 171 causes rotation of the first bevel roller 173b, and concurrent rotation of the free rotating bevel gears 180b and 180b', such that the second bevel roller 174b rotates in a direction opposite to that of the first bevel roller 173b. In other words, it will be seen that in the alternative embodiment shown in FIG. 3c, as in all other embodiments, the right foot pedal 143 will preferably move in an upwards counterclockwise direction ("UCC") as the left pedal is pushed in a downwards clockwise direction ("DC"), and vice-versa.

The bicycle driving assembly 100 of the present invention further includes a variable speed transmission assembly 120 which is structured to vary the amount of power to be inputted by the bicyclist in order to cause movement of the right pedal assembly 140 and the left pedal assembly 170 and therefore the rear wheel 30 of the bicycle. As seen in FIG. 1a, the variable speed transmission assembly 120 comprises a speed-shifting plate 110 which is structured to be disposed about the drive shaft 102 preferably adjacent to the right pedal cylindrical hub 141. The speed-shifting plate 110 is preferably a round, disk-like plate with a central aperture. In the preferred embodiment, the speed-shifting plate 110 also includes a plurality of speed-shifting elongate holes 111 therein. The speed-shifting elongate holes 111 of the speed-shifting plate 110 are preferably generally arc-shaped apertures focused inwardly along a generally clockwise direction as shown in the Figures. Ideally, the shape of the speed-shifting elongate holes 111 is chosen so that the angles between the different pulling rods 150, 151, 160, and 161 and the speed-shifting elongate holes 111 substantially match. The speed-shifting plate 110 is preferably mounted at its central aperture on the drive shaft 102 so that it is flush with the outside of the right pedal cylindrical hub 141 and is structured so that it can rotate. The drive shaft 102 is secured in place by anchoring pins 106 at both ends of the drive shaft 102 as shown in FIG. 2. Still referring to 2a, in the preferred embodiment, a twisted coil spring 162 is mounted on the drive shaft 102 in a cavity generally between the right pedal cylindrical hub 141 and the speed-shifting plate 110. As best shown in FIG. 2c, one end of the twisted coil spring 162 is secured to the right pedal cylindrical hub 141, in a conventional manner such as by utilizing a notch, while the other end is similarly secured to the speed-shifting plate 110. As previously described in the section relating to the right pedal assembly 140, the pulling rods 150, 151, 160, 161 of the right pedal assembly include first 150a and second 151a controllers and first 160a and second 161a auxiliary controllers. As best shown in FIG. 2c, the controllers 150a, 151a, 160a, and 161a include ring sections 150b, 151b, 160b, and 161b are structured to be disposed inside the speed-shifting elongate holes 111 of the speed-shifting plate 110. In order to removably secure the ring sections 150b, 151b, 160b, and 161b to the speed-shifting elongate holes 111 of the speed-shifting plate 110, the speed shifting plate 110 is preferably rotated one to three revolutions counter-clockwise. After rotation of the speed-shifting plate 110 relative to the right pedal cylindrical hub 141, the ring sections 150b, 151b, 160b, 161b are inserted into the speed-shifting elongate holes 111 and secured by inserting anchoring pins 150d, 151d, 160d, 161d into the ring sections as shown in FIG. 2c. By rotating the speed-shifting plate 110 between one and three times counter-clockwise before securement to the controllers 150a, 151a, 160a, and 161a, the twisted coil spring 162 is wound such that it provides a restoring force giving the speed-shifting plate 110 a permanent tendency to rotate clockwise until the ring sections 150b, 151b, 160b, 161b of the controllers 150a, 151a, 160a, 161a reach an end of the speed-shifting elongate holes 111. Although the speed-shifting plate 110, the pulling rods 150 and 151, and the auxiliary pulling rods 160 and 161, preferably rotate in the same direction as the rotation of the right pedal arm 142 when the pedals are stepped on, the drive chain 103, transmits the driving power to the tracking section 230 by executing generally horizontal straight-line back and forth movements instead of rotational movement. The interrelation between the tracking section 230 and the drive chain 103 is discussed in greater detail in the section on the tracking assembly 200. In the preferred embodiment, the drive chain 103 is fastened to fastening sections 150c and 151c of the first and second controller 150a and 151a, as best shown in FIG. 2b. The first and second auxiliary controllers 160a and 161a include drive chain contact sections 160c and 161c to guide the drive chain 103 back towards the tracking section 230. In addition to providing a guide to the drive chain 103, the auxiliary pulling rods 160 and 161, by way of the auxiliary controllers 160a and 161a, help to dramatically improve the back and forth horizontal displacement of the drive chain 103 and therefore the bicycle's movement.

Figure 4A:
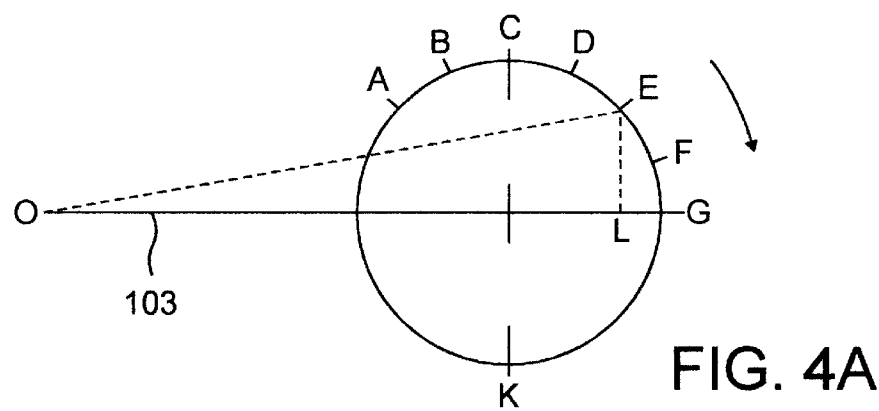
FIG. 4a is a schematic drawing showing the displacement of the pedal and drive chain without the use of auxiliary pulling rods.
Figure 4B:
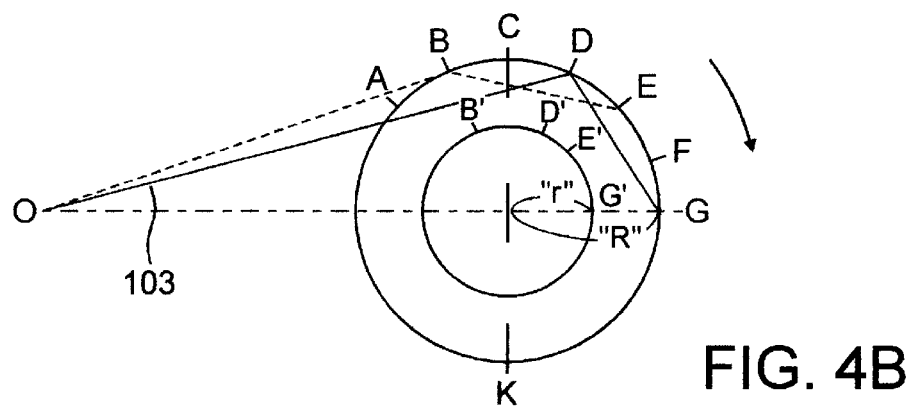
FIG. 4b is a schematic drawing showing the displacement of the pedal and drive chain when auxiliary pulling rods are utilized.
Figure 5A:
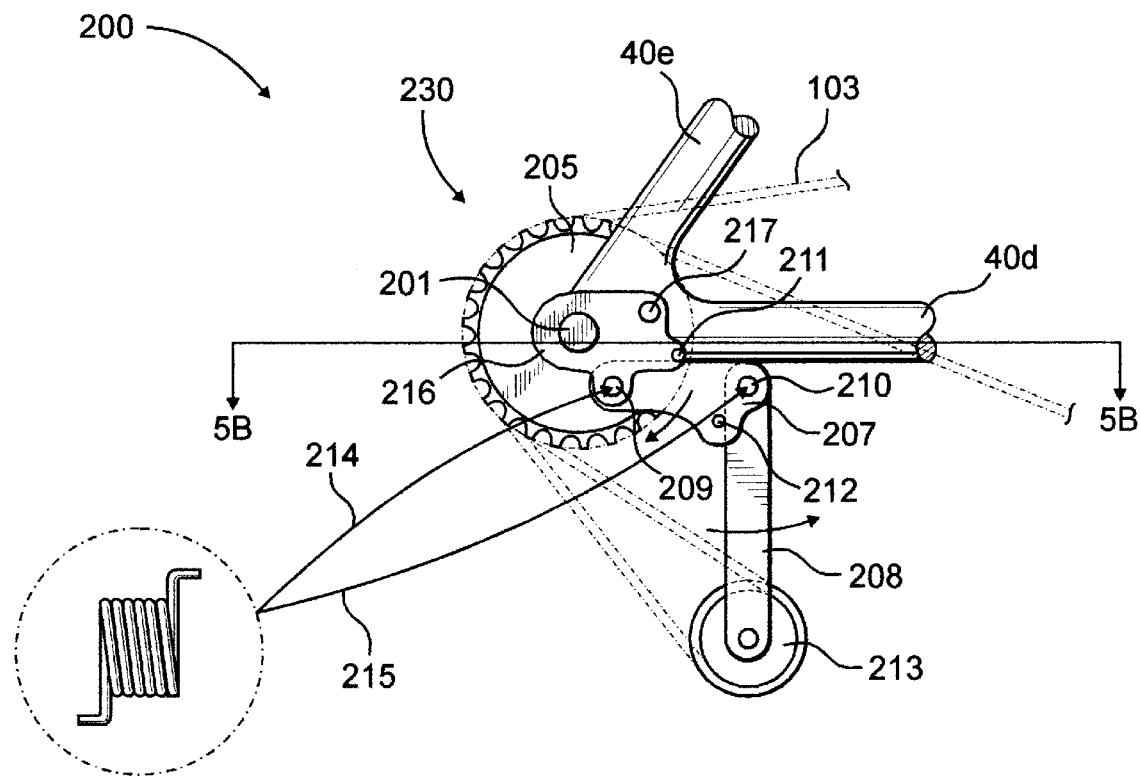
FIG. 5a is a right side view of the tracking assembly of the bicycle driving apparatus showing the tracking section, the shock absorbing section, and the drive chain.
Figure 5B:
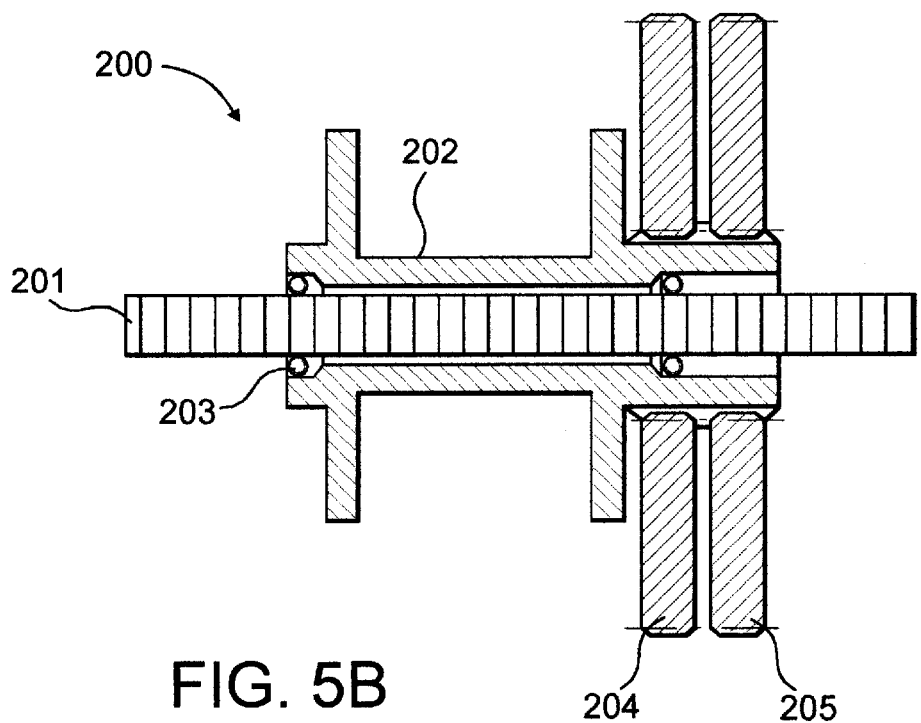

The schematic diagrams shown in FIGS. 4a and 4b show the displacement of the drive chain 103 with and without use of the first and second auxiliary controllers 160a and 161a. As shown by the dashed lines in FIG. 4a, if the auxiliary pulling rods 160 and 161 were not utilized, the drive chain 103 would have moved horizontally from point L to G as the first controller 150a secured to the first pulling rod 150 moved from point E to G in an arc. In other words, the displacement of the drive chain 103 would barely be one-third of the displacement of the right and left foot pedals 143 and 172 stepped on by the bicyclist. FIG. 4b demonstrates the advantage of running the drive chain 103 over the drive chain contact sections 160c and 161c of the first and second auxiliary controllers 160a and 161a. Referring to FIG. 4b, it is seen that when the pulling rods 150 and 151 move from point E to G, the auxiliary pulling rods 160 and 161 move from point B to D, and the actual displacement of the drive chain 103 becomes the same as the displacement of the auxiliary pulling rods 160 and 161 from point B to D. Since the distance between point B and D is the same as the distance between point E and G, the force exerted on the right and left foot pedals 143 and 172 is transmitted without loss to the tracking section 230 via the drive chain 103. Since the speed-shifting elongate holes 111 are structured to form clockwise spirals curling inwards such that the inner spirals result in slower speed, the displacement of the drive chain 103 decreases from E–G to E'–G'0 as the rotating radius of the speed-shifting plate 110 decreases from "R" to "r". Referring now back to FIG. 1a, the second main component of the bicycle driving apparatus of the present invention, namely, the tracking assembly, will be discussed. The tracking assembly 200 is structured to transmit the driving power generated by the right and left pedal assemblies 140 and 170 to a bicycle wheel 30. As best illustrated in FIG. 5-A, the tracking assembly 200 generally comprises a tracking section 230, a shock absorbing section 220, and a drive chain 103. The tracking section 200 is perhaps best shown in FIGS. 5a and 5b and preferably includes a tracking shaft 201 which extends through a center of the bicycle wheel 30. A wheel hub 202 is mounted upon the tracking shaft 201 and is structured to rotate freely, preferably due to the positioning of support bearings 203 inserted between the wheel hub 202 and the tracking shaft 201. The bicycle wheel 30 is rigidly installed on the wheel hub 202 so as to preferably rotate with the wheel hub 202. A first and second tracking gear 204 and 205, on the other hand, are rotatably mounted on the wheel hub 202 as shown in FIG. 5b. Both tracking gears 204 and 205 have gear teeth on the outside that couple and move with the drive chain 103. In the preferred embodiment, the tracking gears 204 and 205 are conventional one-way tracking gears structured to only engage the wheel hub 202 when moving in one direction. In other words, when the tracking gears 204 and 205 rotate counter-clockwise when viewing FIG. 1a, they slide without engaging the rear wheel hub 202, while the tracking gears 204 and 205 engage the wheel hub 202 when moving in a clockwise direction so as to turn the wheel hub 202 and therefore the bicycle wheel 30 in a clockwise direction and move the bicycle forward. The tracking gears 204 and 205 are rotated by the back and forth motion of the drive chain 103. As previously described, one end of the drive chain 103 is preferably secured to the first controller 150c of the first pulling arm 150 while the other end of the drive chain 103 is secured to the second controller 151c of the second pulling arm 151 as shown in FIG. 2b. The drive chain 103, is fastened to the fastening sections 150c and 151c attached to the first and second controllers 150a and 151a generally disposed at the top and bottom of the first and second pulling rods 150 and 151 of the right pedal assembly 140. The drive chain 103 extends back from the first pulling rod 150 over the first tracking gear 204 and heads to a shock-absorbing section 220 and returns back to the second tracking gear 205, extends over the second drive chain contact section 161c and is fastened to the second controller 151c disposed on the second pulling arm 151. It will be seen, therefore, that the top portion of the drive chain 103 is moving in a forward direction while the bottom portion of the drive chain 103 moves backwards. As such, it will be seen that only one of the tracking gears 204 and 205 are engaging the wheel hub 202 in a bicycle-moving clockwise motion at any one time while the other tracking gear simply slides over the wheel hub 202 without engagement. The result is that the wheel hub 202 and therefore the bicycle wheel 30 is engaged in a forward moving direction regardless of the direction of left and right foot pedal 143 and 172 movement.

Figure 6:
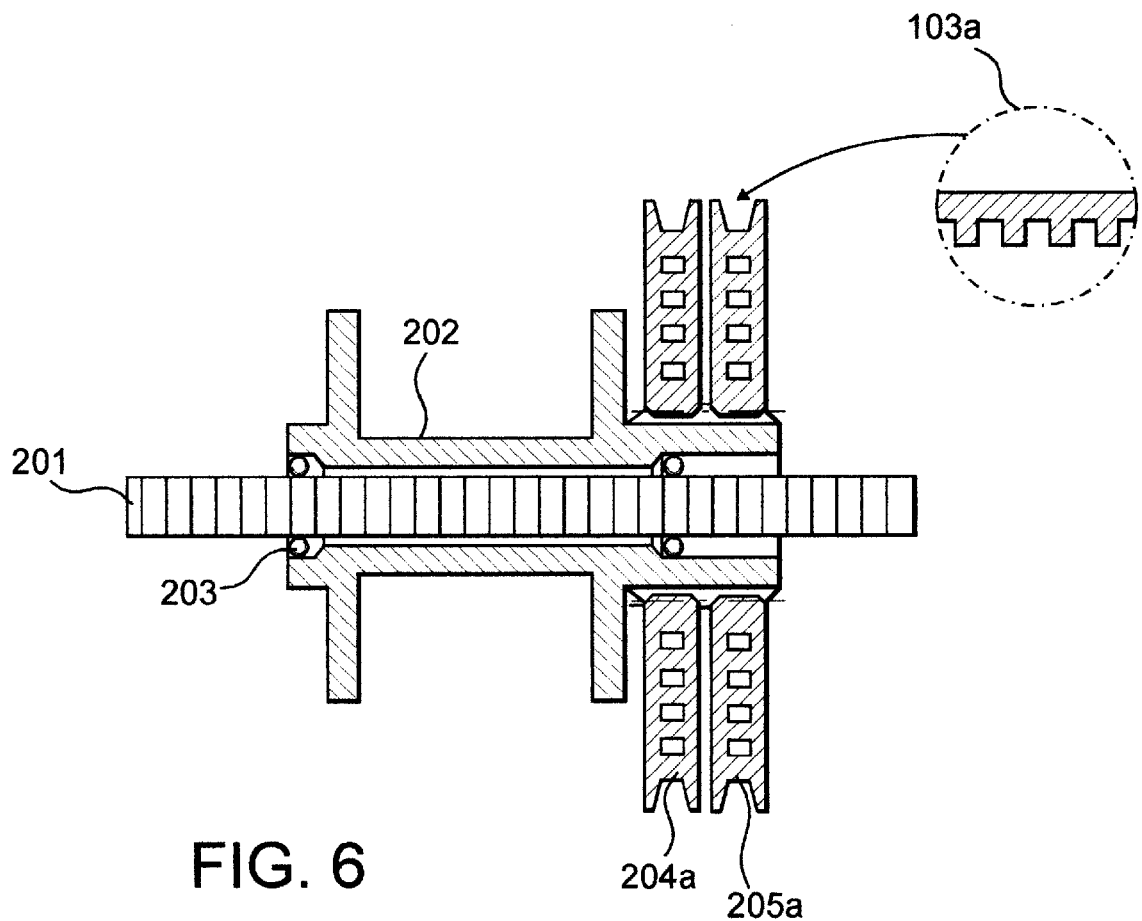

An alternative embodiment to the tracking gears 204 and 205 of the tracking section 230 is shown in FIG. 6. As illustrated, this alternative embodiment includes two timing rollers 204a and 205a in place of tracking gears 204 and 205. The timing rollers 204a and 205a are attached in matching gears to one end of the wheel hub 202 so that a timing belt 103a instead of the drive chain 103 can be connected to the timing rollers 204a and 205a. Protrusions on the timing belt 103a are designed to match the catching holes on the timing rollers 204a and 205a so as to transfer movement of the timing belt 103a to the wheel hub 202 and therefore the bicycle wheel 30.

The tracking assembly 200 of the present invention, includes a shock-absorbing section 220, as best shown in FIG. 5a. As seen in FIG. 5a, bicycle support frames 40e and 40d are inserted over both ends of the tracking shaft 201, preferably as a single unit. The shock absorbing section 220 comprises a roller support plate 216 which is installed and secured to the tracking shaft 201 by a nut and fastening bolt 217. Then, a chain control plate 207 and a chain control rod 208 are installed in sequence using hinge sections 209 and 210 enabling them to swing, while a shock-absorbing roller 213 is installed at the bottom of the control rod 208 and the shock-absorbing roller 213 is permitted to rotate. Shock-absorbing springs 214 and 215, preferably constructed of twisted coil springs, are inserted and fastened to the hinge sections 209 and 210 such that the springs exert a torque around the hinge sections 209 and 210. However, blocking bolts 211 and 212 are inserted to limit the rotation of the hinge sections 209 and 210 on the control plate 207 and the chain control rod 208. It should be noted that since the drive chain 103 is connected to the shock-absorbing roller 213 with a given twist, either the diameter of the shock-absorbing roller 213 should be increased to reduce the twist angle or the drive chain 203 should be extended to an appropriate length to minimize this twist.

In order to determine the proper length of the drive chain 103 which needs to be provided for the present invention, the speed-shifting lever 301 is put at the highest step, the first and second controllers 150a and 151a and the first and second auxiliary controllers 160a and 161a are turned until they face each other vertically and one end of the drive chain 103 is connected to the fastening section 150c of the first controller 150a, while the other end of the drive chain 103 is guided to the top of the second drive chain contact section 160c of the second auxiliary controller 160a. The drive chain 103 is then passed over the second tracking gear 205 and down to the front of the shock-absorbing roller 213, threaded upward from behind over the first tracking gear 204, passed under the second drive chain contact section 161c of the second auxiliary controller 161a, and fastened to the fastening section 151c of the second pulling controller 151a. The drive chain 103 is pulled taut so as to move the chain control rod 208 such that it, ideally, touches the support bolt 212. The tension in the drive chain 103 throughout the pulling and relaxing phases during the bicycle driving or speed shifting is maintained at an appropriate level by the action of the shock-absorbing springs 214 and 215 inserted in the hinge sections 209 and 210.

Figure 7A:
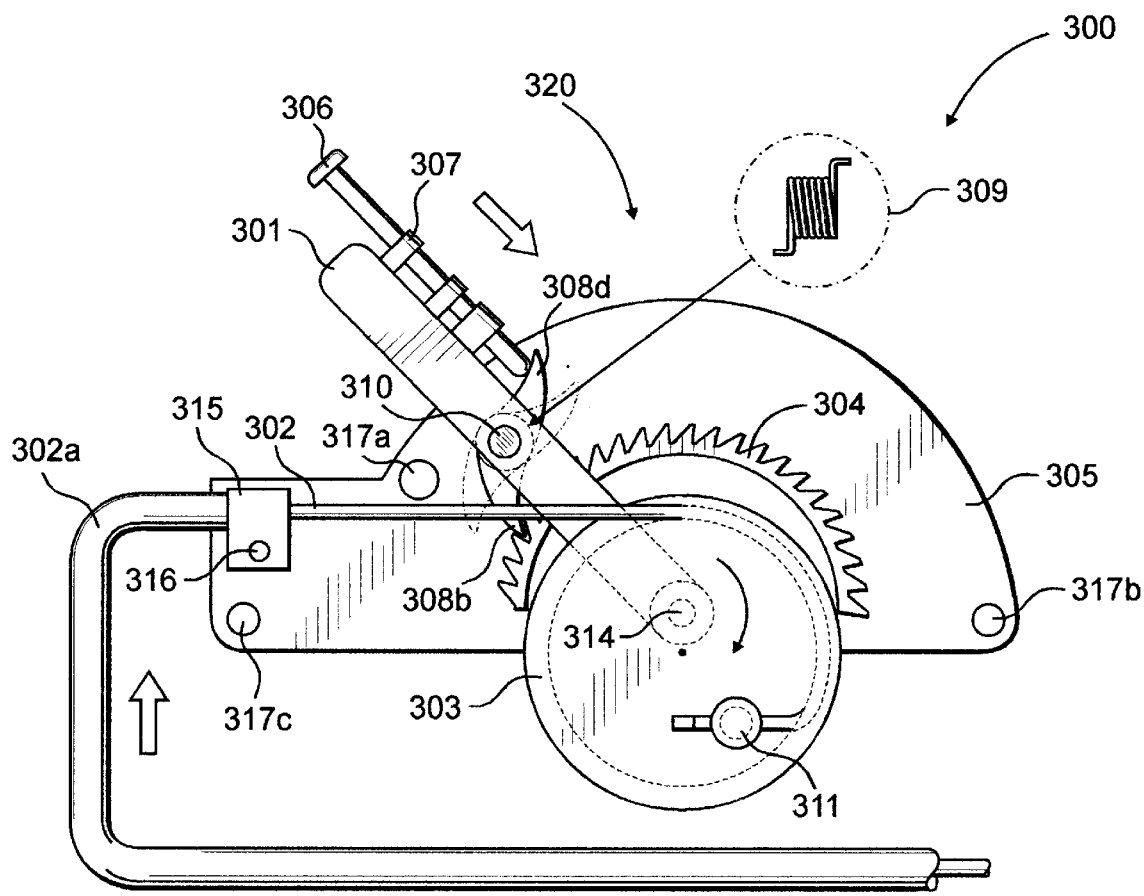

The improved bicycle driving apparatus 10 of the present invention additionally includes a speed shifting assembly 300 structured to rotate the speed-shifting plate 110 so as to move the first and second controllers 150a and 151a, and the first and second auxiliary controllers 160a and 161a, between different positions along a path of the speed-shifting elongate holes 111. The speed-shifting assembly 300 includes a speed-shifting unit 320 as best shown in FIG. 7a. The speed-shifting unit 320 includes a lever housing 305, preferably of unitary construction including assembly shafts 317a, 317b, and 317c, upon which the lever center shaft 314 and the lever housing 305 are assembled. In the preferred embodiment, the lever housing 305 is marked with speed-shifting scales and steps, and preferably fastened to a center shaft 314 and the assembly shafts 317a, 317b, and 317c by conventional fasteners such as bolts, for example. A ratchet wheel 304 is attached to the lever housing by a bolt or by welding in a unit construction while preferably keeping a gap of 5 to 10 mm to the lever housing 305. A lever stick 306 is preferably installed on one side of the speed-shifting lever 301 such that it is guided by a stick guide 307. A lever ratchet 308 is preferably installed on the lever below the stick guide 307 by a hinge in the hinge section 310 with an inserted twisted coil spring 309. The opposing end sections 308a and 308b of the lever ratchet 308 are preferably curved in opposite directions as shown in FIG. 7a. One end section 308a is located close to the bottom of the lever stick 306, while the other end section 308b is placed so that it is engaged by the gear teeth of the ratchet wheel 304 by the force of the twisted coil spring 309. The gear teeth of the ratchet wheel 304 represent the speed-shifting steps or different speeds available. It will be appreciated that the number and size of the gear teeth on the ratchet wheel 304 can be modified so as to change the number of different gears or speeds available. The speed-shifting lever 301 built in this manner is fastened to the V-belt type ratchet wheel 303, while centering the speed shifting wire 302 so that it will not slip off the ratchet wheel 304. The speed-shifting sheath 302a is covered by a fastening cover 315 and anchored by a fastening bolt 316.

Figure 7B:
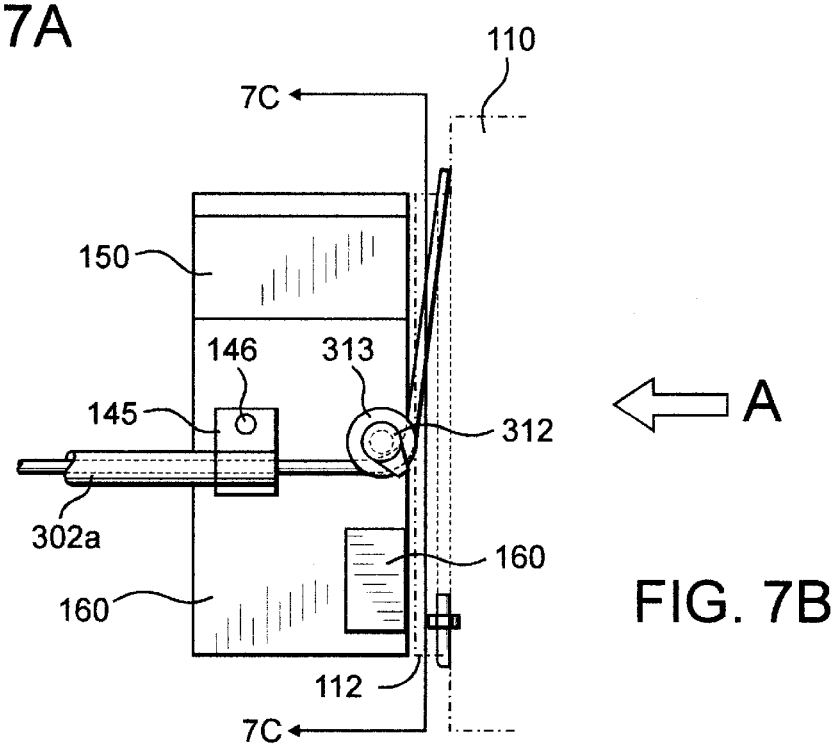
FIG. 7b is a top view of the right pedal cylindrical hub taken along lines 7b—7b of FIG. 7c showing the location of the transfer roller and securement of the speed-shifting wire to the speed-shifting plate cylindrical hub.
Figure 7C:
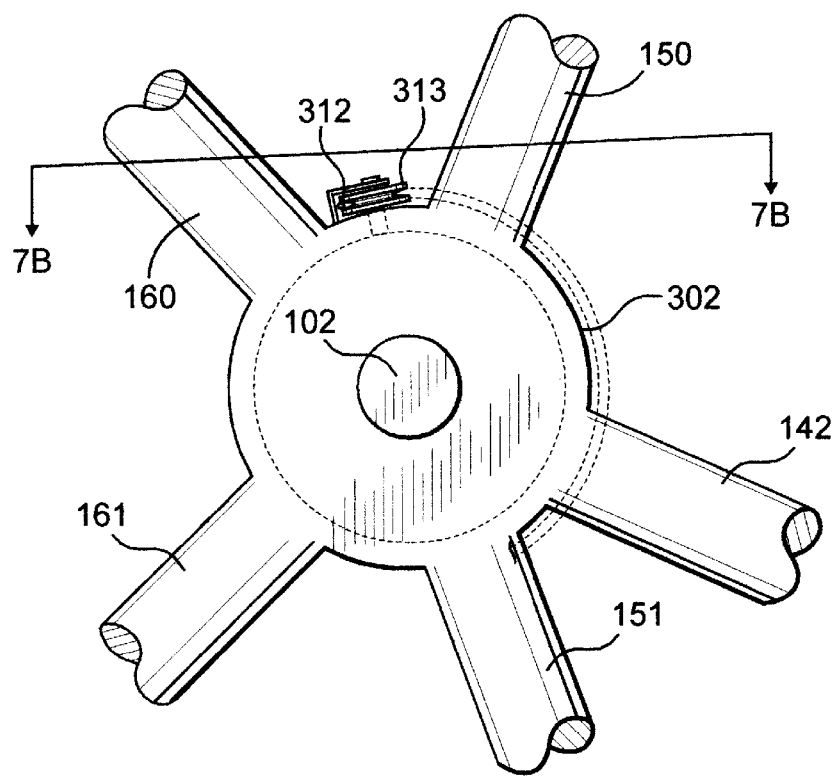
FIG. 7c is a cross-sectional view of the right pedal cylindrical hub taken along lines 7c—7c of FIG. 7b showing the location of the transfer roller and securement of the speed-shifting wire to the speed-shifting plate hub.
Figure 7D:
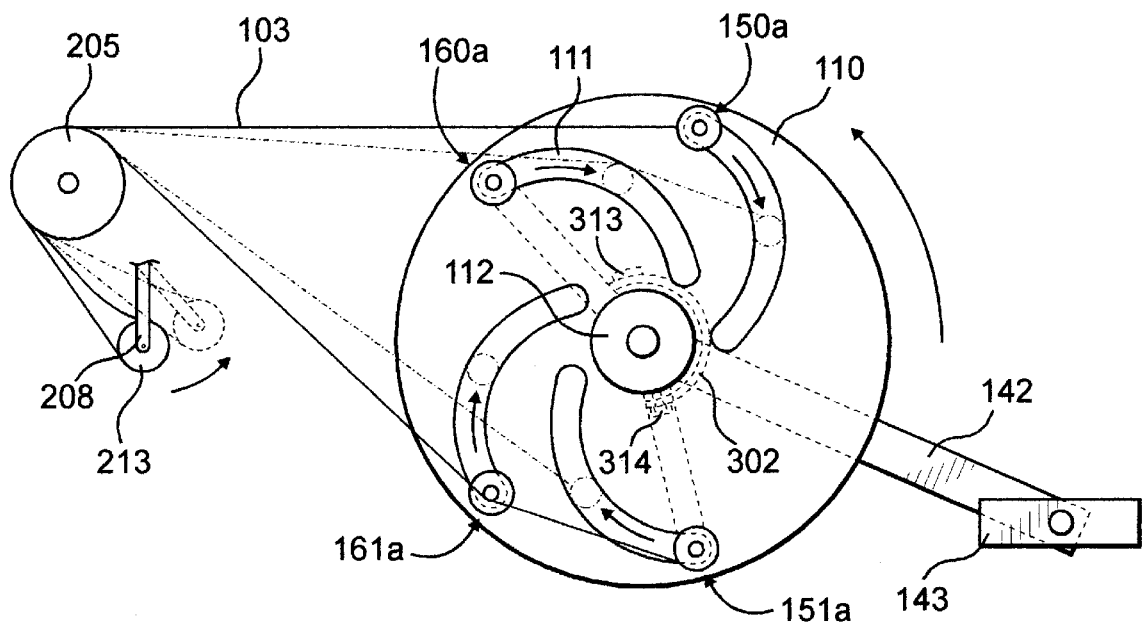
FIG. 7d is a right side view of the right pedal assembly and the tracking assembly illustrating movement of the controllers along the speed-shifting elongate holes of the speed-shifting plate.

In the preferred embodiment of the speed-shifting assembly 300 of the present invention, a speed-shifting wire 302 is preferably utilized to control the rotation of the speed-shifting plate 110 and therefore the distance between the controllers 150a, 151a, 160a, 161, and the right pedal cylindrical hub 141. As previously described relating to the section on the speed-shifting plate 110 and the variable speed transmission 120, the radial position of the controllers 150a, 151a, 160a, and 161a, determine the gear of the bicycle driving assembly 10. In the preferred embodiment, the speed-shifting wire 302 is fastened at the bottom of a lever wheel 303 with a bolt 311, so that the wire is wound around the lever wheel 303 to the right and upwards, as shown in FIG. 7a, and then placed inside the speed-shifting sheath 302a, which, in turn, is fastened to one side of the lever housing 305. As shown in FIG. 7b, one end of the speed-shifting sheath 302a is fastened to the lever housing 305 while the other end is fastened to the right pedal cylindrical hub 141 using a fastening cover 145 and a bolt 146, between the pulling rod 150 and the auxiliary pulling rod 160. FIG. 7c is a cross-sectional view of the right pedal cylindrical hub 141 taken along direction 7c—7c of FIG. 7b. As shown in FIG. 7b and 7c, while the speed-shifting plate 110 of the right pedal assembly 140 is oriented in the highest speed step by using the highest part of the speed-shifting elongate holes 111, one end of the speed-shifting sheath 302a is fastened to the right pedal cylindrical hub 141 using the fastening cover 145 and a bolt 146. The speed-shifting wire 302 coming out of the speed-shifting sheath 302a is guided to the right around a transfer roller 313 inside a separation prevention cover 312, which is fastened in front of the speed-shifting sheath 302a. Next, the speed-shifting wire 302 wraps approximately halfway around the speed-shifting plate cylindrical hub 112, which is attached without a gap to the right pedal cylindrical hub 141, and then is fastened to one end of the speed-shifting plate cylindrical hub 112 of the speed-shifting plate 110. If a gap is generated between the right pedal cylindrical hub 141 and the speed-shifting plate cylindrical hub 112 during assembly, the speed-shifting wire 302 can be trapped inside the gap and interfere with the rotation of the speed-shifting plate 110.

The locations where the speed-shifting sheath 302a and the transfer roller 313 can be installed are not limited to the specific locations described herein and shown in the figures. It will be appreciated that the speed-shifting sheath 302a and the transfer roller 313 can be installed anywhere between the first and second auxiliary pulling arms 160 and 161 of the right pedal cylindrical hub 141 or between the first pulling rod 150 and the right pedal arm 142, while simply altering the position to fasten one end of the speed-shifting wire 302 to the speed-shifting plate cylindrical hub 112. Since the right pedal cylindrical hub 141 pivots with a maximum angle of 135 degrees, fastening the speed-shifting sheath 302a to the right pedal cylindrical hub 141 should provide sufficient slack regardless of the fastening location.

In order to determine the proper length of the speed-shifting sheath 302a and the speed-shifting wire 302 which must be utilized, the speed-shifting lever 301 is moved toward the highest speed step, and the speed-shifting wire 302 is guided inside the speed-shifting sheath 302a, which is attached to one side of the lever housing 305. The speed-shifting wire 302 is then wrapped approximately one-third of a rotation around the lever wheel 303 and pulled down towards the center of the lever wheel 303 until the speed-shifting plate 110 on the right pedal assembly 140 moves slightly. Finally, the speed-shifting wire can be fastened using between one and three bolts 311.

In order to shift from a high-speed step to a low-speed step, the speed-shifting lever 301 is pushed toward the housing assembly shaft 317b causing the lever wheel 303 to pull the speed-shifting wire 302. The speed-shifting wire 302 will be pulled so as to turn the transfer roller 313 fixed on the right pedal cylindrical hub 141, eventually turning the speed-shifting plate 110 counterclockwise, and making the radial distance between the four controllers 150a, 151a, 160a, and 161a and the right pedal cylindrical hub 141 smaller. As the bicyclist continues to push the speed-shifting lever 301, the speed-shifting plate 110 also continues to turn so that the radial distance between the four controllers 150a, 151a, 160a, and 161a and the right pedal cylindrical hub become increasingly small and eventually reaches the lowest step.

On the other hand, to shift from a low-speed step to a high-speed step, the lever stick 306 is pressed down by the bicyclist's palm or thumb while the speed-shifting lever 301 is pulled toward the lever housing assembly shaft 317a. The lever stick 306 is subsequently released when the desired speed step is reached. The shifting stops at the desired step due to the restoring force of the twisted coil spring 162, which is inserted and fastened between the right pedal cylindrical hub 141 and the speed-shifting cylindrical hub 112. This embodiment will have the added advantage of permitting the speed to be shifted not only while the bicycle is moving, but also when it is at rest.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An improved bicycle driving apparatus structured to generate driving power, said improved bicycle driving apparatus comprising:

a right pedal assembly and a left pedal assembly, each structured for movement in an alternating direction and in a generally arcuate path of less than 360 degrees, said right pedal assembly including a right pedal cylindrical hub secured to a drive shaft, a first and second pulling rod extending from said right pedal cylindrical hub, a first and second auxiliary pulling rod extending from said right cylindrical hub, and a right pedal arm extending therefrom, said right pedal arm including a right foot pedal secured thereto, said first pulling rod including a first controller and said second pulling rod including a second controller, each of said first and second controllers structured to move along a length of said pulling rods, said first and second auxiliary pulling rods having controllers including a first and second drive chain contact section mounted thereon, said left pedal assembly including a left pedal arm, a first roller, and a second roller disposed upon said drive shaft, said first roller structured to rotate with said left pedal arm and said second roller structured to rotate with said drive shaft, said left pedal arm including a left pedal secured thereto, a belt extending from said first roller to said second roller by way of an auxiliary roller such that a clockwise rotation of said left pedal arm causes a counterclockwise rotation of said second roller, and therefore, said drive shaft, right pedal cylindrical hub, and said right pedal arm secured thereto, and said belt further structured such that a clockwise rotation of said right pedal arm causes a clockwise rotation of said drive shaft and said second roller and a counterclockwise rotation of said first roller and said left pedal arm.

2. An improved bicycle driving apparatus as recited in claim 1 further comprising:

a variable speed transmission assembly structured to vary the amount of power required for movement of said right pedal assembly and said left pedal assembly, said variable speed transmission assembly including a speed-shifting plate mounted on said drive shaft adjacent to said right pedal cylindrical hub, said speed-shifting plate including four speed-shifting elongate holes disposed therein, each of said speed-shifting elongate holes structured to receive one of said first and second controllers and said first and second auxiliary controllers therein such that said first and second controllers and said first and second auxiliary controllers are slidable along a path defined by said speed-shifting elongate holes, and a twisted coil spring mounted on said drive shaft in a cavity generally between said right pedal cylindrical hub and said speed-shifting plate, a first end of said twisted-coil spring is secured to said right pedal cylindrical hub and a second end of said twisted-coil spring being secured to said speed-shifting plate such that said speed-shifting plate is biased to rotate.

3. An improved bicycle driving apparatus as recited in claim 1 further comprising:

a tracking assembly structured to transmit the driving power generated by said right and left pedal assemblies to a bicycle wheel, said tracking assembly including a tracking section, a shock absorbing section, and a drive chain, said tracking section including a tracking shaft extending through a center of the bicycle wheel, a wheel hub rotatably mounted upon said tracking shaft with the bicycle wheel secured therein, and a first and second tracking gear rotatably mounted upon said wheel hub, said drive chain including a first end and a second end, said first end of said drive chain being secured to said first controller on said first pulling rod, said drive chain is guided by said drive chain contact section of said first auxiliary controller of said first auxiliary pulling rod and extending over said first tracking gear to said shock absorbing section and returning over said second tracking gear for guided movement by said second auxiliary controller of said second auxiliary pulling rod such that said second end of said drive chain is secured to said second controller on said second pulling rod, said first and second tracking gear structured to be continuously engaged by said drive chain but engaging said wheel hub only when such engagement will rotate said wheel hub in a forward-moving direction.

4. An improved bicycle driving apparatus as recited in claim 2 further comprising:

a speed-shifting assembly structured to rotate said speed-shifting plate so as to move said first and second controllers and said first and second auxiliary controllers between a first position and a second position along said path of said speed-shifting elongate holes.

5. An improved bicycle driving apparatus comprising:

a) a driving assembly structured to generate driving power, said driving assembly including:

i) a right pedal assembly and a left pedal assembly, each structured for movement in an alternating direction and in a generally arcuate path of less than 360 degrees, said right pedal assembly including a right pedal cylindrical hub secured to a drive shaft, a first and second pulling rod extending from said right pedal cylindrical hub, a first and second auxiliary pulling rod extending from said right cylindrical hub, and a right pedal arm extending therefrom, said right pedal arm including a right foot pedal secured thereto, said first pulling rod including a first controller and said second pulling rod including a second controller, each of said first and second controllers structured to move along a length of said pulling rods, said first and second auxiliary pulling rods having controllers including a first and second drive chain contact section mounted thereon, said left pedal assembly including a left pedal arm, a first roller, and a second roller disposed upon said drive shaft, said first roller structured to rotate with said left pedal arm and said second roller structured to rotate with said drive shaft, said left pedal arm including a left pedal secured thereto, a belt extending from said first roller to said second roller by way of an auxiliary roller such that a clockwise rotation of said left pedal arm causes a counterclockwise rotation of said second roller, and therefore, said drive shaft, right pedal cylindrical hub, and said right pedal arm secured thereto, said belt further structured such that a clockwise rotation of said right pedal arm causes a clockwise rotation of said drive shaft and said second roller and a counterclockwise rotation of said first roller and said left pedal arm, ii) a variable speed transmission assembly structured to vary the amount of power required for movement of said right pedal assembly and said left pedal assembly, said variable speed transmission assembly including a speed-shifting plate mounted on said drive shaft adjacent to said right pedal cylindrical hub, said speed-shifting plate including four speed-shifting elongate holes disposed therein, each of said speed-shifting elongate holes structured to receive one of said first and second controllers and said first and second auxiliary controllers therein such that said first and second controllers and said first and second auxiliary controllers are slidable along a path defined by said speed-shifting elongate holes, a twisted coil spring mounted on said drive shaft in a cavity generally between said right pedal cylindrical hub and said speed-shifting plate, a first end of said twisted-coil spring is secured to said right pedal cylindrical hub and a second end of said twisted-coil spring being secured to said speed-shifting plate such that said speed-shifting plate is biased to rotate, b) a tracking assembly structured to transmit the driving power generated by said right and left pedal assemblies to a bicycle wheel, said tracking assembly including a tracking section, a shock absorbing section, and a drive chain, said tracking section including a tracking shaft extending through a center of the bicycle wheel, a wheel hub rotatably mounted upon said tracking shaft with the bicycle wheel secured therein, and a first and second tracking gear rotatably mounted upon said wheel hub, said drive chain including a first end and a second end, said first end of said drive chain being secured to said first controller on said first pulling rod, said drive chain is guided by said drive chain contact section of said first auxiliary controller of said first auxiliary pulling rod and extending over said first tracking gear to said shock absorbing section and returning over said second tracking gear for guided movement by said second auxiliary controller of said second auxiliary pulling rod such that said second end of said drive chain is secured to said second controller on said second pulling rod, said first and second tracking gear structured to be continuously engaged by said drive chain but engaging said wheel hub only when such engagement will rotate said wheel hub in a forward-moving direction, and c) a speed-shifting assembly structured to rotate said speed-shifting plate so as to move said first and second controllers and said first and second auxiliary controllers between a first position and a second position along said path of said speed-shifting elongate holes.

6. An improved bicycle driving apparatus as recited in claim 5 wherein said shock-absorbing section of said tracking assembly includes a shock-absorbing roller mounted such that said drive chain is kept in tension.

7. An improved bicycle driving apparatus as recited in claim 6 wherein said shock-absorbing section of said tracking assembly further comprises:

a roller support plate structured to be positioned on said tracking shaft, a chain control plate positioned on said roller support plate, a chain control rod positioned on said chain control plate and structured so as to swing relative to a point on said chain control plate, and said shock-absorbing roller is positioned on said chain control rod and structured to freely rotate.

8. An improved bicycle driving apparatus as recited in claim 5 wherein said speed-shifting assembly comprises:

a speed-shifting unit, said speed-shifting unit having a lever center shaft positioned therein, a speed-shifting lever having a first end and a second end, said first end being rotatably mounted to said lever center shaft, a lever wheel mounted on said lever center shaft and secured to said speed-shifting lever such that movement of said speed-shifting lever causes rotation of said lever wheel, a speed-shifting wire having a first end and a second end, said first end being secured to a point on said lever wheel and positioned around an outer circumference of said lever wheel such that movement of said speed-shifting lever causes rotation of said lever wheel and movement of said second end of said speed-shifting wire, said second end of said speed-shifting wire being secured to a position on said speed-shifting plate such that movement of said speed-shifting lever causes movement of said speed-shifting wire and rotation of said speed-shifting plate so as to move said first and second controllers and said first and second auxiliary controllers between a first and a second position along said path of said speed-shifting elongate holes, and means for selectively locking the position of said speed-shifting lever such that a corresponding position of said speed-shifting plate is fixed and movement of said first and second controllers and said first and second auxiliary controllers is inhibited.

9. An improved bicycle driving apparatus as recited in claim 8 wherein said speed shifting unit is mounted on a bicycle support frame.

10. An improved bicycle driving apparatus structured to generate driving power, said improved bicycle driving apparatus comprising:

a right pedal assembly and a left pedal assembly, each structured for movement in an alternating direction and in a generally arcuate path of less than 360 degrees, said right pedal assembly including a right pedal cylindrical hub secured to a drive shaft, a first and second pulling rod extending from said right pedal cylindrical hub, a first and second auxiliary pulling rod extending from said right cylindrical hub, and a right pedal arm extending therefrom, said right pedal arm including a right foot pedal secured thereto, said first pulling rod including a first controller and said second pulling rod including a second controller, each of said first and second controllers structured to move along a length of said pulling rods, said first and second auxiliary pulling rods having controllers including a first and second drive chain contact section mounted thereon, said left pedal assembly including a left pedal arm with a left foot pedal, a first bevel roller, a plurality of free rotating bevel gears, and a second bevel roller disposed upon said drive shaft, said first bevel roller structured to rotate with said left pedal arm, and said second bevel roller structured to rotate with said drive shaft, said first bevel roller, said plurality of free rotating bevel gears, and said second bevel roller being matingly engaged such that a clockwise rotation of said left pedal arm causes a counterclockwise rotation of said second bevel roller, and therefore, said drive shaft, right pedal cylindrical hub, and said right pedal arm secured thereto, and said first bevel roller, said plurality of free rotating bevel gears, and said second bevel roller being matingly engaged such that a clockwise rotation of said right pedal arm causes a clockwise rotation of said drive shaft and said second bevel roller, and a counterclockwise rotation of said first bevel roller and said left pedal arm.

11. An improved bicycle driving apparatus as recited in claim 10 further comprising:

a variable speed transmission assembly structured to vary the amount of power required for movement of said right pedal assembly and said left pedal assembly, said variable speed transmission assembly including a speed-shifting plate mounted on said drive shaft adjacent to said right pedal cylindrical hub, said speed-shifting plate including four speed-shifting elongate holes disposed therein, each of said speed-shifting elongate holes structured to receive one of said first and second controllers and said first and second auxiliary controllers therein such that said first and second controllers and said first and second auxiliary controllers are slidable along a path defined by said speed-shifting elongate holes, and a twisted coil spring mounted on said drive shaft in a cavity generally between said right pedal cylindrical hub and said speed-shifting plate, a first end of said twisted-coil spring is secured to said right pedal cylindrical hub and a second end of said twisted-coil spring being secured to said speed-shifting plate such that said speed-shifting plate is biased to rotate.

12. An improved bicycle driving apparatus as recited in claim 10 further comprising:

a tracking assembly structured to transmit the driving power generated by said right and left pedal assemblies to a bicycle wheel, said tracking assembly including a tracking section, a shock absorbing section, and a drive chain, said tracking section including a tracking shaft extending through a center of the bicycle wheel, a wheel hub rotatably mounted upon said tracking shaft with the bicycle wheel secured therein, and a first and second tracking gear rotatably mounted upon said wheel hub, said drive chain including a first end and a second end, said first end of said drive chain being secured to said first controller on said first pulling rod, said drive chain is guided by said drive chain contact section of said first auxiliary controller of said first auxiliary pulling rod and extending over said first tracking gear to said shock absorbing section and returning over said second tracking gear for guided movement by said second auxiliary controller of said second auxiliary pulling rod such that said second end of said drive chain is secured to said second controller on said second pulling rod, said first and second tracking gear structured to be continuously engaged by said drive chain but engaging said wheel hub only when such engagement will rotate said wheel hub in a forward-moving direction.

13. An improved bicycle driving apparatus as recited in claim 11 further comprising:

a speed-shifting assembly structured to rotate said speed-shifting plate so as to move said first and second controllers and said first and second auxiliary controllers between a first position and a second position along said path of said speed-shifting elongate holes.

* * * * *